Figures 1, 2:
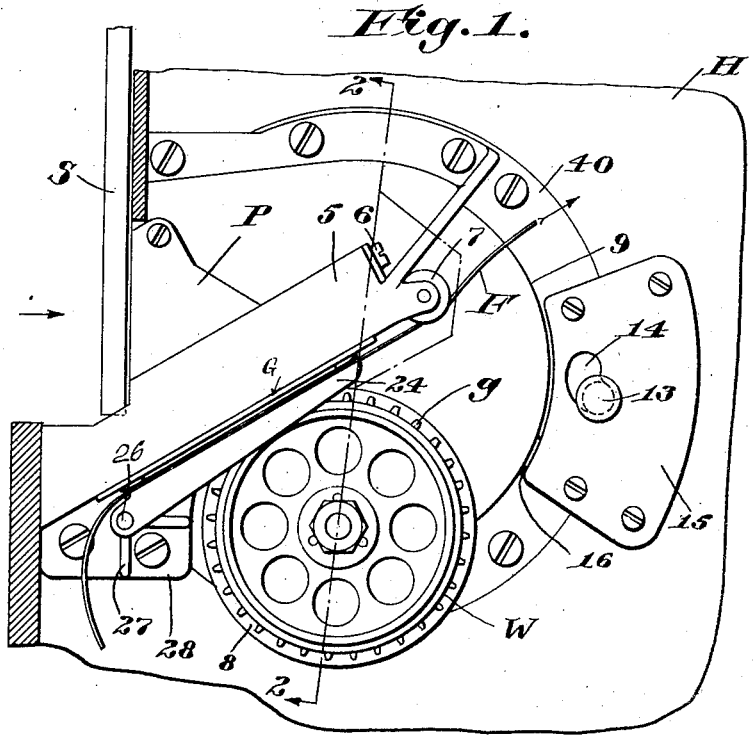

April 6, 1926.

J. A. BALL ET AL

FILM FEEDING AND REGISTERING MECHANISM

Filed August 3, 1921      3 Sheets-Sheet 1

1,579,805

Inventors
Joseph A. Ball
Ernest A. Gallison
by Roberts, Roberts & Cushman
their Attorneys April 6, 1926.  1,579,805

J. A. BALL ET AL

FILM FEEDING AND REGISTERING MECHANISM

Filed August 3, 1921   3 Sheets-Sheet 2

Inventors
Joseph A. Ball
Ernest A. Gallison
by Roberts Roberts & Cushman
their Attorneys April 6, 1926. 1,579,805
J. A. BALL ET AL
FILM FEEDING AND REGISTERING MECHANISM
Filed August 3, 1921 3 Sheets-Sheet 3
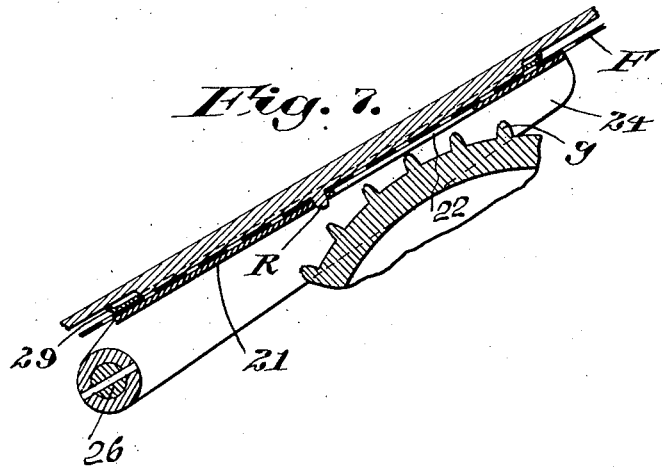
Fig. 7.
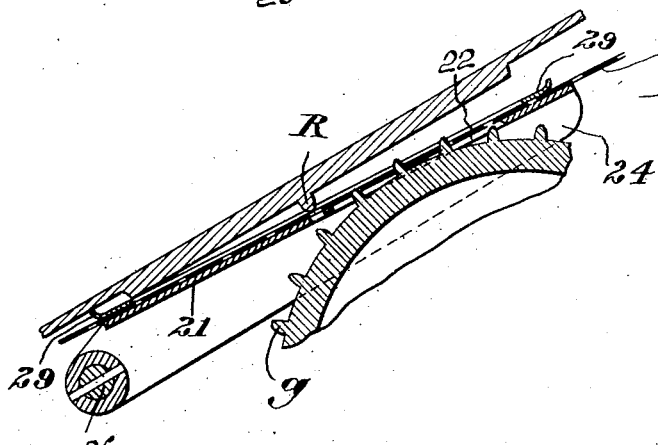
Fig. 8.
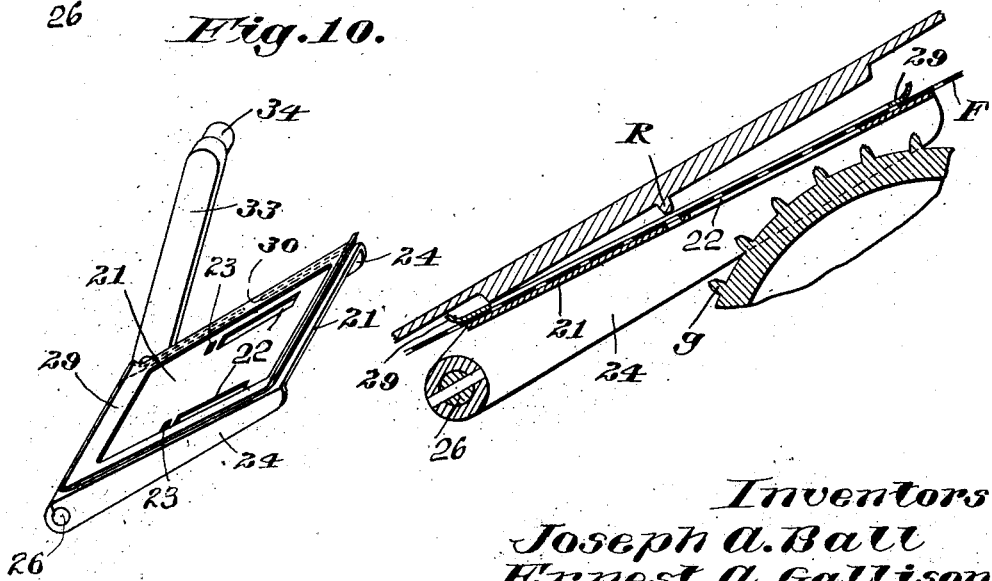
Fig. 9.
Fig. 10.
Inventors
Joseph A. Ball
Ernest A. Gallison
by Roberts Roberts & Cushman
their Attorneys Patented Apr. 6, 1926.

1,579,805

UNITED STATES PATENT OFFICE.

JOSEPH A. BALL, OF JAMAICA PLAIN, AND ERNEST A. GALLISON, OF WATERTOWN, MASSACHUSETTS, ASSIGNORS, BY MESNE ASSIGNMENTS, TO TECHNICOLOR MOTION PICTURE CORPORATION, OF BOSTON, MASSACHUSETTS, A CORPORATION OF MAINE.

FILM FEEDING AND REGISTERING MECHANISM.

Application filed August 3, 1921. Serial No. 489,529.

*To all whom it may concern:*

Be it known that we, JOSEPH A. BALL and ERNEST A. GALLISON, both citizens of the United States of America, and residents of Jamaica Plain and Watertown, respectively, in the counties of Suffolk and Middlesex, respectively, and State of Massachusetts, have invented new and useful Improvements in Film Feeding and Registering Mechanism, of which the following is a specification.

This invention relates to apparatus for intermittently advancing a cinematographic film and more particularly to apparatus of the intermittently rotating feed wheel or drum type.

Objects of the invention are quickly to advance a film, to afford intervals of rest which are relatively long in comparison to the intervals of intermittent advance, to avoid injury to the film in the intermittent advance, to free the film from the advancing means during the rest intervals, to avoid injury to the film in freeing it from the advancing means or in restoring contact, and to position the film accurately during the intervals of rest.

However, the particular object is to attain the aforesaid results in a machine where the film is moved a plurality of picture spaces at each intermittent advance, as e. g. in certain types of color cinematographic machines, and at the same time to avoid excessive vibration and to restrict the mechanism to a convenient and practicable size.

Other objects of the invention are to facilitate threading the film into the machine, and to thread the film without moving the film guide and without disengaging the intermeshing driving elements of the intermittent feed wheel or drum.

The invention comprises means operating in synchronism with the intermittent feed wheel for intermittently disengaging the film and wheel from each other, preferably by producing relative movement between the wheel and the film radially of the wheel. Said means preferably includes means for holding the film approximately in a plane tangent to the wheel so that the film is associated with the wheel through only a small extent of its periphery, whereby the relative movement between the wheel and film radially of the wheel is facilitated. The relative movement between the film and wheel is preferably in a direction approximately perpendicular to the film as well as radially of the wheel. By maintaining the film approximately in a plane tangent to the wheel (instead of bending the film around a considerable extent of the wheel circumference as usual) and by producing the relative movement perpendicularly of the film and radially of the wheel, the relative movement can be readily effected even with a wheel of the type having peripheral sprocket teeth intermeshing with the film.

The feed wheel is actuated by intermittent drive mechanism including a rotating element and the feed wheel is mounted to swing about the axis of this element. When employing drive mechanism having a driving element (e. g. a pin wheel) intermeshing with a driven element (e. g. a star wheel) the feed wheel and the driven element are preferably mounted to swing together about the axis of the driving element and this axis is preferably disposed approximately in the plane of the approximately straight portion of the film associated tangentially with the feed wheel. Thus the feed wheel may be swung substantially perpendicularly from the film without throwing the driving and driven elements out of mesh.

The film is held in positive relation to the feed wheel by a guide which is preferably pivoted and which preferably carries a cam follower by which the guide is swung to and from the wheel. The cam for actuating the follower is formed in one of the driving elements, preferably the pin wheel when employing pin and star wheels for intermittently driving the feed wheel.

One or more registering pins are provided accurately to position the film after it is disengaged from the feed wheel and these pins are preferably positioned on the side of the film opposite to the wheel slightly in the rear of the wheel with their ends overlapping the ends of the sprocket teeth lengthwise thereof so that the film moves upon the registering pins as it moves off the sprocket teeth. In order to facilitate this transfer and avoid injury to the film the overlapping ends of the pins and teeth may be tapered, whereby the film may be transversely shifted by the tapered ends as it is moved from the teeth to the pins or vice versa.

Figure 3:
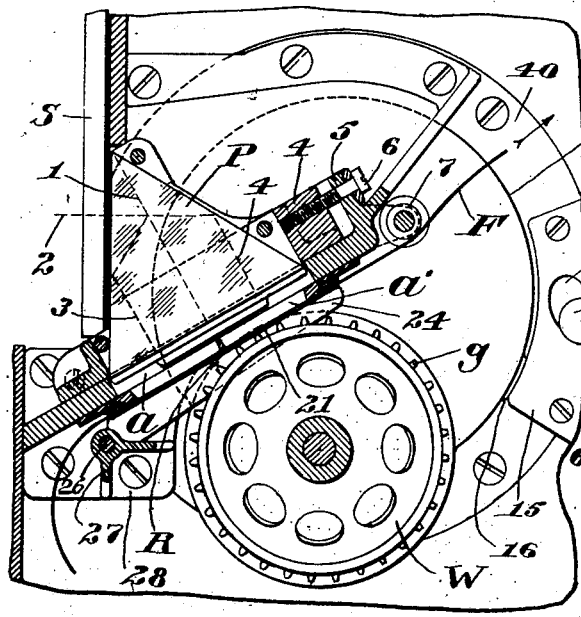
Figure 4:
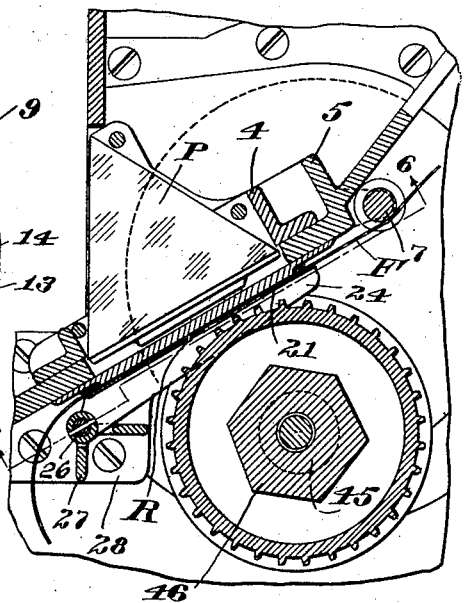
Figure 5:
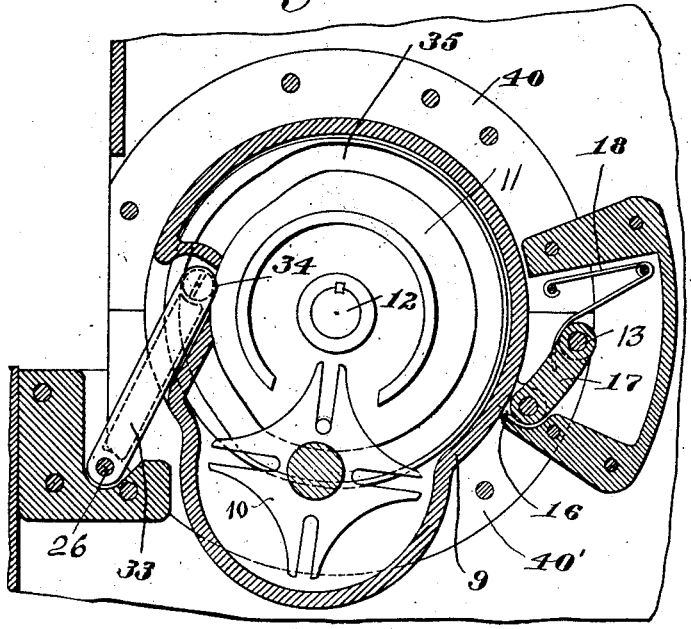
Figure 6:
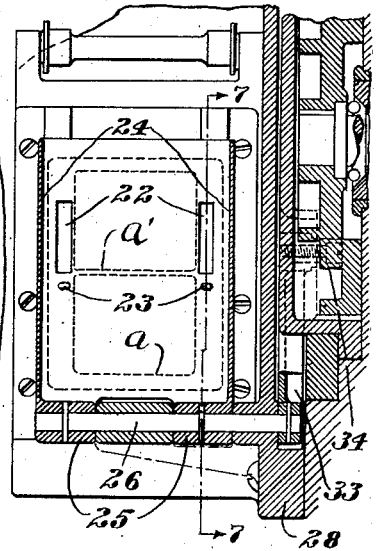

In order more clearly to set forth the nature of the invention, one concrete embodiment is shown in the accompanying drawings in which:

Fig. 1 is a side elevation of a mechanism, showing a portion of the housing in section;
Fig. 2 is a section on line 2—2 of Fig. 1;
Fig. 3 is a section on line 3—3 of Fig. 2;
Fig. 4 is a section on line 4—4 of Fig. 2;
Fig. 5 is a section on line 5—5 of Fig. 2;
Fig. 6 is a section on line 6—6 of Fig. 4;
Fig. 7 is a detail section showing the film on the registering pins;
Fig. 8 is a similar view showing the film on the sprocket wheel;
Fig. 9 is a similar wheel showing the film intermediate the registering pins and the sprocket wheel, the sprocket wheel being retracted; and
Fig. 10 is a perspective view of the film guide.

The particular embodiment of the invention chosen for the purpose of illustration comprises a housing H, a revolving shutter S, the upper portion of the shutter being broken away, a prism set P, a film guide G, a sprocket wheel W carrying sprocket teeth $g$ on its periphery, and a pair of registering pins R. The prism set P is of the type disclosed in application Serial No. 77,237, filed February 9, 1916 which comprises two prisms with a light-dividing grid 1 (Fig. 3) therebetween, the prisms being shaped and positioned so that a beam of light entering along the line 2 is divided at the grid 1 into two component beams 3 and 4 which are reflected to adjacent picture spaces on the film F in inverted relationship with respect to each other. The prism set is preferably mounted for adjustment relative to the film gate apertures $a$ and $a'$, the mount 4 being adjustable in the frame 5 both lengthwise and crosswise of the film-gate apertures by means of screws, one of which is shown at 6 in Fig. 3. The film F passes through the guide G and thence over the roller 7 in the direction of the arrows in Figs. 1 and 3.

The sprocket wheel W is journaled in an eccentric bushing 45 having a hexagonal part 46 for adjustment, the bushing being mounted in a bearing 8 threaded into a cupped support 9. The support 9 is mounted in a recess in the housing H, by means of a split washer 40—40' (Figs. 2 and 5), to rotate about its axis X for a purpose hereinafter described. The sprocket wheel W is connected to a star wheel 10 which meshes with a pin wheel 11, the pin wheel being mounted on a drive shaft 12 whose axis is coincident with the aforesaid axis X. Continuous rotation of the pin wheel 11 produces intermittent rotation of the star wheel 10 and the sprocket wheel W. A handle 13, which extends outwardly through an arcuate slot 14 in the plate 15 (Fig. 1), connects with a lug 16 on the bearing support 9 through the medium of a link 17 (Fig. 5), a spring 18 being provided normally to hold the parts in the normal position illustrated in the drawings.

By moving the handle 13 upwardly along the arcuate slot, the bearing support 9 is rotated in a counter-clockwise directio about the axis X thereby swinging the sprocket wheel away from the film into the position shown in Fig. 9. As will appear from Fig. 3, the axis of the rotatable bearing support 9 is disposed substantially in the plane of the film so that the movement of the sprocket wheel is substantially perpendicular to the film when the bearing support 9 is rotated. By rotating the sprocket wheel and the star wheel about the axis of the pin wheel, the sprocket wheel may be retracted from the film for threading a film into the machine without throwing the pin and star wheels out of mesh, whereby the predetermined relationship between the pin and star wheels necessary for the synchronous operation of the parts is not lost in threading the machine.

The film guide G comprises a plate 21 having slots 22 to permit the sprocket teeth to engage the film, having openings 23 to receive the ends of the registering pins R and having depending side flanges 24 for stiffening purposes. The guide G is provided at one end with bearings 25 pinned to a shaft 26 which is journaled in a bracket 27 on the housing plate 28. The guide also comprises a thin strip 29 parallel to the plate 21 and joined thereto at the side 30, the part 29 having an aperture registering with the apertures $a$ and $a'$ in the film-gate. The upper portion 29 of the guide is not connected to the lower portion 21 on one side, the left-hand side in Fig. 6, so that the film may be slipped between the parts 21 and 29 from that side.

The aforesaid shaft 26 carries on its inner end an arm 33 which is keyed thereto at its lower end and which carries a cam roll 34 at its upper end. The cam roll 34 is disposed in a cam groove 35 in the side of the pin wheel 11, the shape of the cam groove being such as to move the film guide into the position shown in Fig. 7 at the end of each intermittent advance of the film and then into the position shown in Fig. 8 immediately before the next intermittent movement of the sprocket wheel.

As shown in Figures 7, 8 and 9, the sprocket wheel is disposed only slightly in advance of the registering pins so that the tooth or teeth of the sprocket wheel in operative engagement with the film are disposed slightly in advance of the registering pins. Furthermore the ends of the pins and teeth preferably overlap and are preferably tapered as shown in these figures. Moreover, the registering pins R are disposed adjacent the plane of the light dividing grid 1, which plane is symmetrical with respect to the images formed at the two film gate apertures as disclosed in the prior Patent No. 1,451,325 granted April 10, 1924.

The operation of the mechanism is as follows: To thread the machine, the handle 13 is moved upwardly in the slot 14 thereby swinging the sprocket wheel away from the film-gate into the position shown in Fig. 9, in which position the film may be slid into the film guide. Upon returning the handle 13 to the position shown, the spring 18 holds the sprocket wheel in normal position. When the shaft 12 is continuously rotated, either by hand or by motor, the pin wheel 11 is rotated continuously and the star wheel 10 and sprocket wheel W are rotated intermittently. The film guide G is oscillated back and forth between the positions shown in Figs. 7 and 8 in synchronism with the intermittent motion of the sprocket wheel. Thus the film is moved off the sprocket teeth and on to the registering pins at the end of each intermittent advance and vice versa immediately before the next intermittent advance.

By this mechanism the film is quickly advanced so that the ratio between intervals of film rest and the intervals of film travel is relatively high, the mechanism is very compact, light in weight and the distance of travel of the intermittently moving parts are short, whereby excessive vibration is avoided. At the same time the film is freed from the feed mechanism and accurately positioned relative to the image forming parts of the machine during the periods of rest. In these respects the machine is incomparable to feed mechanisms having reciprocatory film-feeding parts, especially in color picture machines and other machines where the film must be advanced a plurality of picture spaces at a time and then accurately registered for a brief interval.

We claim:

1. The method of recurrently registering succeeding sections of a cinematographic film in a film gate which comprises intermittently advancing the film longitudinally into approximate registration and accurately registering the film after each intermittent advance by shifting the film transversely upon a registering pin.

2. The method of recurrently registering succeeding sections of cinematographic film in a film gate which comprises intermittently advancing the film into approximate registration by engagement with a sprocket wheel, and accurately registering the film after each intermittent advance by shifting the film radially from the sprocket wheel upon a registering pin.

3. The method of recurrently registering succeeding sections of cinematographic film with the light aperture of a film gate which comprises intermittently advancing the film longitudinally into approximate registration with the aperture by engagement with the film within the limits of the light aperture and accurately registering the film after each intermittent advance by shifting the film transversely upon a registering pin within said limits.

4. The method of recurrently registering succeeding sections of cinematographic film with the light aperture of a film gate which comprises intermittently advancing the film longitudinally into approximate registration with the aperture by engagement with a sprocket wheel opposite the light aperture and accurately registering the film after each intermittent advance by shifting the film transversely upon a tapered pin intermediate the ends of the aperture.

5. The method of recurrently registering succeeding sections of cinematographic film relative to a plurality of optical paths which comprises intermittently advancing the film into approximate registration with the optical paths and accurately registering the film after each intermittent advance by shifting the film transversely upon a registering pin intermediate the axes of the optical paths.

6. Apparatus for recurrently registering succeeding sections of cinematographic film relative to a plurality of optical paths comprising means for intermittently advancing the film into approximate registration with the optical paths, a registering pin intermediate the axes of the optical paths, and means for alternately shifting the film from said advancing means to said registering pin for accurately registering the film, said pin being constructed and arranged to move the film into exact registration with said optical paths when the film is shifted thereto.

7. Apparatus for recurrently registering succeeding sections of cinematographic film relative to a plurality of optical paths comprising means for intermittently advancing the film into approximate registration with the optical paths, a registering pin approximately mid-way between the axes of the optical paths, and means for alternately shifting the film from said advancing means to said registering pin for accurately registering the film, said pin being constructed and arranged to move the film into exact registration with said optical paths when the film is shifted thereto.

8. Apparatus for recurrently registering succeeding sections of cinematographic film relative to a plurality of optical paths comprising a sprocket wheel in one of said paths continued for intermittently advancing the film into approximate registration with the optical paths, registering means within the transverse limits of said paths, and means for alternately shifting the film from said advancing means to said registering means for accurately registering the film, said registering means being constructed and arranged to move the film into exact registration with said optical paths when the film is shifted thereto.

9. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, said guide being pivotally mounted and carrying a cam follower, and means for intermittently actuating said sprocket and guide in synchronism, said means including a cam engaging said follower.

10. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, and interacting driving and driven elements for actuating said sprocket intermittently, said driven element and sprocket wheel being mounted to swing about the axis of said driving element to retract the sprocket wheel for threading.

11. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, and interacting driving and driven elements for actuating said sprocket intermittently, said driven element and sprocket wheel being mounted to swing about the axis of said driving element to retract the sprocket wheel for threading, and said axis being disposed substantially in the plane of the portion of the film tangentially associated with the sprocket wheel so that the sprocket teeth move substantially perpendicularly from the film when the sprocket wheel is retracted as aforesaid.

12. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, interacting driving and driven elements for actuating said sprocket intermittently, said driven element and sprocket wheel being mounted to swing about the axis of said driving element to retract the sprocket wheel for threading, and said axis being disposed substantially in the plane of the portion of the film tangentially associated with the sprocket wheel so that the sprocket teeth move substantially perpendicularly from the film when the sprocket wheel is retracted as aforesaid, and one of said elements having a cam for moving said guide.

13. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, and interacting driving and driven elements for actuating said sprocket intermittently, said driven element and sprocket wheel being mounted to swing about the axis of said driving element to retract the sprocket wheel for threading, said driving element having a cam for actuating said guide.

14. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, and interacting driving and driven elements for actuating said sprocket intermittently, said driven element and sprocket wheel being mounted to swing about the axis of said driving element to retract the sprocket wheel for threading, said driving element having a cam for actuating said guide and having its axis disposed substantially in the plane of the film in the guide.

15. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, said guide being pivoted and having a cam follower, and interacting driving and driven elements for actuating said sprocket intermittently, one of said elements having a cam for actuating said follower.

16. Apparatus of the character described comprising a sprocket wheel for advancing the film intermittently, a film guide for moving the film from the sprocket teeth during intervals of rest, the film being tangentially associated with said sprocket wheel throughout a small extent of its periphery so that the film may be moved toward and from the wheel without interference with the sprocket teeth, said guide being pivoted and having a cam follower, and interacting driving and driven elements for actuating said sprocket intermittently, said driving element having a cam for actuating said follower.

17. Apparatus of the character described comprising a sprocket wheel for advancing the film intermittently, a film guide for moving the film from the sprocket teeth during said intervals of rest, the film being tangentially associated with said sprocket wheel throughout a small extent of its periphery so that the film may be moved toward and from the wheel without interference with the sprocket teeth, said guide being pivoted and having a cam follower, and interacting driving and driven elements for actuating said sprocket intermittently, said driving element having a cam for actuating said follower and having its axis disposed substantially in the plane of the film in the guide, and said driven element and sprocket wheel being mounted to swing about said axis to retract the sprocket for threading.

18. Apparatus of the character described comprising a film-gate having a film passageway and a light aperture on one side of the passageway, a registering pin intermediate the ends of the light aperture on said side of the passageway, means on the other side of the passageway for intermittently advancing the film, the operative engagement of said means with the film being confined to the region defined by said ends of the aperture, and means synchronized with said advancing means for shifting the film from the registering pin to said means before each intermittent advance and vice versa after each intermittent advance, said pin being constructed and arranged to move the film into exact registration with said aperture when the film is shifted thereto.

19. Apparatus of the character described comprising a film-gate having a film passageway and a light aperture on one side of the passageway, a registering pin intermediate the ends of the light aperture on said side of the passageway, a film-advancing sprocket operative upon the film intermediate said ends of the aperture on the other side of the passageway, means for rotating said sprocket, and synchronous means for shifting the film from said pin to said sprocket before each intermittent advance of the sprocket and vice versa after each intermittent advance, said pin being constructed and arranged to move the film into exact registration with said aperture when the film is shifted thereto.

20. Film advancing and registering mechanism comprising a film guide, a registering pin on one side of the guide, a sprocket wheel on the other side of the guide, the sprocket wheel carrying teeth which overlap the registering pin longitudinally thereof, means for intermittently rotating said wheel, and means for intermittently shifting said guide to move the film first on said teeth and then on said pin respectively before and after each intermittent rotation of the sprocket wheel.

21. Film advancing and registering mechanism comprising a film guide, a registering pin on one side of the guide, a sprocket wheel on the other side of the guide, the end of each sprocket tooth overlapping the end of the registering pin and one of the overlapping ends being tapered, means for intermittently rotating said wheel, and means for intermittently shifting said guide to move the film first on said teeth and then on said pin respectively before and after each intermittent rotation of the sprocket wheel.

22. Film advancing and registering mechanism comprising a film guide, a registering pin on one side of the guide, a sprocket wheel on the other side of the guide, means for intermittently rotating said wheel, the sprocket wheel carrying teeth which overlap the registering pin longitudinally thereof, the overlapping ends of the teeth and registering pin being tapered, and means for intermittently shifting said guide to move the film first on said teeth and then on said pin respectively before and after each intermittent rotation of the sprocket wheel.

23. Film advancing and registering mechanism comprising a toothed sprocket on one side of the film for advancing the film into approximate registration, a registering pin on the other side of the film for shifting the film into accurate registration, a film guide movable transversely of the film alternately to move the film on said pin and said sprocket respectively, means including a rotating element for actuating said sprocket intermittently, and a cam on said element for producing said transverse movement of the guide.

24. Film advancing and registering mechanism comprising a toothed sprocket on one side of the film for advancing the film into approximate registration, a registering pin on the other side of the film for shifting the film into accurate registration, a film guide movable transversely of the film alternately to move the film on said pin and said sprocket respectively, interacting driving and driven elements for actuating said sprocket intermittently, and a cam on one of said elements for producing said transverse movement of the guide.

25. Film advancing and registering mechanism comprising a toothed sprocket on one side of the film for advancing the film into approximate registration, a registering pin on the other side of the film for shifting the film into accurate registration, a film guide movable transversely of the film alternately to move the film on said pin and said sprocket respectively, interacting driving and driven elements for actuating said sprocket intermittently, and a cam on said driving element for producing said transverse movement of the guide.

26. Film advancing and registering mechanism comprising a registering pin on one side of the film, a toothed sprocket on the other side of the film, a film guide movable transversely of the film alternately to move the film upon said pin and said sprocket respectively, said guide being pivotally mounted and carrying a cam follower, and means including a cam engaging said follower for intermittently actuating said guide and said sprocket in synchronism.

27. Film advancing and registering mechanism comprising a registering pin on one side of the film, a sprocket wheel on the other side of the film, a film guide movable transversely of the film alternately to move the film upon said pin and said sprocket respectively, and interacting driving and driven elements for actuating said sprocket intermittently, said driven element and sprocket wheel being mounted to swing about the axis of said driving element to retract the sprocket wheel for threading.

28. Film advancing and registering mechanism comprising a registering pin on one side of the film, a sprocket wheel on the other side of the film, a film guide movable transversely of the film alternately to move the film upon said pin and said sprocket respectively, and interacting driving and driven elements for actuating said sprocket intermittently, said driven element and sprocket wheel being mounted to swing about the axis of said driving element to retract the sprocket wheel for threading, and said axis being disposed substantially in the plane of the film in the guide so that the sprocket teeth move substantially perpendicularly from the film when the sprocket wheel is retracted as aforesaid.

29. Film advancing and registering mechanism comprising a registering pin on one side of the film, a sprocket wheel on the other side of the film, a film guide movable transversely of the film alternately to move the film upon said pin and said sprocket respectively, and interacting driving and driven elements for actuating said sprocket intermittently, said driven element and sprocket wheel being mounted to swing about the axis of said driving element to retract the sprocket wheel for threading, and one of said elements having a cam for producing the transverse movement of said guide.

30. Film advancing and registering mechanism comprising a registering pin on one side of the film, a sprocket wheel on the other side of the film, a film guide movable transversely of the film alternately to move the film upon said pin and said sprocket respectively, and interacting driving and driven elements for actuating said sprocket intermittently, said driven element and sprocket wheel being mounted to swing about the axis of said driving element to retract the sprocket wheel for threading, and said driving element having a cam for producing the transverse movement of said guide.

31. Film advancing and registering mechanism comprising a registering pin on one side of the film, a sprocket wheel on the other side of the film, a film guide movable transversely of the film alternately to move the film upon said pin and said sprocket respectively, and interacting driving and driven elements for actuating said sprocket intermittently, said driven element and sprocket wheel being mounted to swing about the axis of said driving element to retract the sprocket wheel for threading, said driving element having a cam for producing the transverse movement of said guide and having its axis disposed substantially in the plane of the film in the guide, and said driven element and sprocket wheel being mounted to swing about said axis to retract the sprocket wheel for threading.

32. Film advancing and registering mechanism comprising a registering pin on one side of the film, a toothed sprocket on the other side of the film, a film guide movable transversely of the film alternately to move the film upon said pin and said sprocket respectively, said guide being pivoted and having a cam follower, and interacting driving and driven elements for actuating said sprocket intermittently, one of said elements having a cam for actuating said follower.

33. Film advancing and registering mechanism comprising a registering pin on one side of the film, a toothed sprocket on the other side of the film, a film guide movable transversely of the film alternately to move the film upon said pin and said sprocket respectively, said guide being pivotally mounted and carrying a cam follower, and means including a cam engaging said follower for intermittently actuating said guide and said sprocket in synchronism.

34. Film advancing and registering mechanism comprising a registering pin on one side of the film, a toothed sprocket on the other side of the film, a film guide movable transversely of the film alternately to move the film upon said pin and said sprocket respectively, said guide being pivotally mounted and carrying a cam follower, and interacting driving and driven elements for actuating said sprocket intermittently, said driving element having a cam for actuating said follower and having its axis disposed substantially in the plane of the film in the guide, and said driven element and sprocket wheel being mounted to swing about said axis to retract the sprocket for threading.

35. Apparatus of the character described comprising a film-gate having a film passageway open on one side to permit the transmission of a plurality of images to or from separate areas of the film, a registering pin on said side of the passageway for engagement with the film at a point adjacent the interval between said areas, a film-advancing sprocket on the opposite side of said passageway for engagement with the film adjacent said interval, and means for shifting the film from said pin to said sprocket before each advance and vice versa after each advance.

36. Apparatus of the character described comprising a wheel for advancing the film and interacting driving and driven elements for actuating said wheel intermittently, said wheel and driven element being mounted to swing about the axis of the driving element to retract the wheel for threading without disengaging the driving and driven element from each other, and said axis being disposed approximately in a plane tangent to the wheel on the side engaged by the film whereby said retraction is approximately perpendicular to the film.

37. Apparatus of the character described comprising a wheel for advancing the film and interacting driving and driven elements for actuating said wheel intermittently, said wheel and driven element being mounted to swing about the axis of the driving element to retract the wheel for threading without disengaging the driving and driven elements from each other, means including a rotating element for driving said wheel, and a support for said wheel pivoted to swing about the axis of said element, and having its axis disposed substantially in the plane of the film in the guide, and said driven element and sprocket wheel being mounted to swing about said axis to retract the sprocket wheel for threading.

Signed by us at Boston, Mass. this 28th day of July, 1921.

JOSEPH A. BALL.
ERNEST A. GALLISON.